(12) United States Patent
Brauer et al.

(10) Patent No.: US 9,009,546 B2
(45) Date of Patent: Apr. 14, 2015

(54) HEURISTIC FAILURE PREVENTION IN SOFTWARE AS A SERVICE (SAAS) SYSTEMS

(71) Applicant: International Business Machines Corporation, Armonk, NY (US)

(72) Inventors: Nikolaus K. Brauer, Austin, TX (US); Kenneth E. Brunsen, Nashua, NH (US); Daniel C. Gurney, Worcester, MA (US); Russell L. Holden, Boxborough, MA (US); Michael J. Kerrigan, Salem, NH (US); Michael I. Killoran, Westford, MA (US); Peter O. Mierswa, Sterling, MA (US); Chester E. Ryder, III, Dracut, MA (US); Vinod R. Seraphin, Westford, MA (US)

(73) Assignee: International Business Machines, Armonk, NY (US)

( * ) Notice: Subject to any disclaimer, the term of this patent is extended or adjusted under 35 U.S.C. 154(b) by 243 days.

(21) Appl. No.: 13/628,874

(22) Filed: Sep. 27, 2012

(65) Prior Publication Data

US 2014/0089746 A1    Mar. 27, 2014

(51) Int. Cl.
G06F 11/00    (2006.01)
G06F 11/07    (2006.01)
H04L 12/24    (2006.01)

(52) U.S. Cl.
CPC .......... *G06F 11/004* (2013.01); *G06F 11/0709* (2013.01); *G06F 11/079* (2013.01); *H04L 41/00* (2013.01)

(58) Field of Classification Search
CPC ............ G06F 11/0709; G06F 11/0766; G06F 11/0772
USPC ......... 714/57, 4.1, 4.11, 43, 48; 709/224, 226
See application file for complete search history.

(56) References Cited

U.S. PATENT DOCUMENTS

| | | | |
|---|---|---|---|
| 6,892,330 B2 * | 5/2005 | Lee | 714/48 |
| 7,818,416 B2 * | 10/2010 | Roy | 709/224 |
| 7,840,674 B1 | 11/2010 | Sterling | |
| 8,090,995 B2 * | 1/2012 | Klein | 714/46 |
| 8,762,795 B2 * | 6/2014 | LeCroy et al. | 714/48 |
| 2008/0201776 A1 | 8/2008 | Rao et al. | |
| 2013/0198825 A1 * | 8/2013 | Feytons | 726/6 |

* cited by examiner

*Primary Examiner* — Philip Guyton
(74) *Attorney, Agent, or Firm* — Isaac Gooshaw (57) ABSTRACT

A request is received by a first computer. The first computer delegates the first request to a second computer. The second computer attempts to process the first request and identifies an imminent fault as a result of the attempt. The second computer sends a message to the first computer indicating an imminent fault as a result of the attempted processing of the first request. The first computer sends a message to a third computer indicating that a second request matching the first request should not be processed.

20 Claims, 4 Drawing Sheets

HEURISTIC FAILURE PREVENTION IN SOFTWARE AS A SERVICE (SAAS) SYSTEMS

FIELD OF THE INVENTION

The present invention relates generally to server failures and more specifically to the prevention of heuristic failure of software as a service (SaaS) systems.

BACKGROUND OF THE INVENTION

In a client-server environment, there may be thousands of clients requesting service from a server. For example, a file sharing service provided by a Network File System (NFS) server over the internet may receive thousands of such requests per minute, from clients with diverse geographical locations. With so many clients relying on any given server it is important to maintain the proper functioning of each server.

Servers often become overloaded with requests for data. It is well-known in the art to distribute processing and communications activity across a computer network so that no single server is overwhelmed. This task is accomplished by providing several servers having redundant capabilities and managing the distribution of requests among these servers. If one server becomes unavailable or overburdened, requests are forwarded to another server that is currently available to serve the request. This process is called load balancing.

If a request is submitted to a server and the server does not provide communication indicating whether or not the server successfully processed the request, then there are typically two possible causes of the server failing to provide communication. The first possible cause of the failure to communicate is that the request was successfully processed, but the server failed to respond for some reason. The second possible cause of the failure to communicate is that the request was not successfully processed. Without knowing which of these has taken place, resubmitting the request to a different server may cause the request to be processed twice. Another processing of a request by a second server can be detrimental if the request has resulted in the fault or failure of the first server.

SUMMARY

Embodiments of the present invention disclose a method, computer program product, and system for preventing heuristic failure of SaaS systems. In an exemplary embodiment, a first computer receives a request for service from a client computer. The first computer delegates the request to a second computer. The first computer receives a first message from the second computer. The first message contains data that identifies the request and indicates an imminent fault of the second computer. The first message also indicates that the imminent fault of the second computer was caused by the processing of the request.

The first computer sends a second message to a third computer. The second message indicates a warning about the request.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
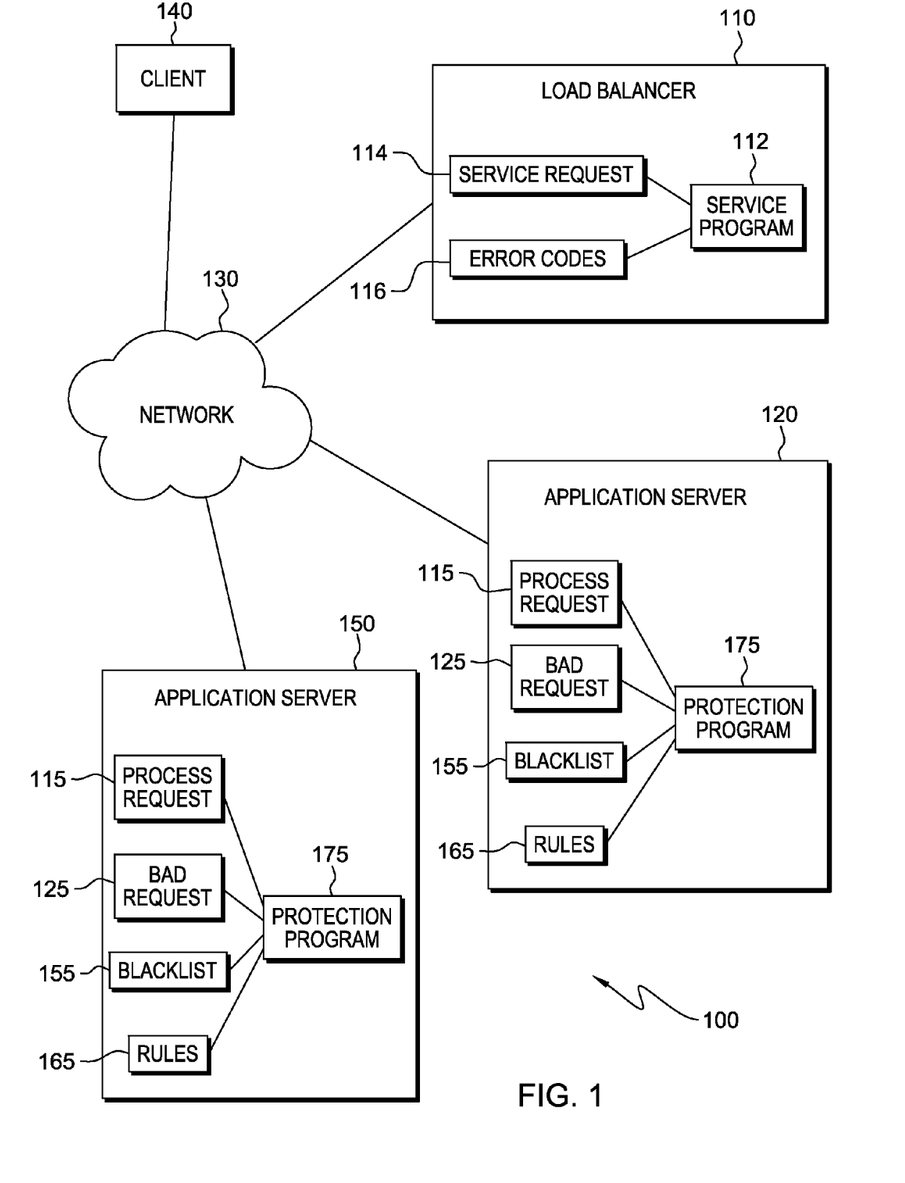
FIG. 1 is a functional block diagram illustrating a request processing environment, in accordance with an embodiment of the present invention.

The present invention will now be described in detail with reference to the figures. FIG. 1 is a functional block diagram illustrating a system for request distribution, control and processing in a SaaS system, generally designated request processing environment 100, in accordance with one embodiment of the present invention.

In this exemplary embodiment, request processing environment 100 includes client 140, load balancer 110, application server 120 and application server 150, all interconnected over network 130.

In this exemplary embodiment, service program 112, service request 114 and error codes 116 are stored on load balancer 110, and protection program 175, process request 115, bad request 125, blacklist 155 and rules 165 are stored on application server 120 and application server 150. However, in other embodiments, service program 112, service request 114 and error codes 116 of load balancer 110, and protection program 175, process request 115, bad request 125, blacklist 155 and rules 165 of application server 120 and application server 150, may be stored externally and accessed through a communication network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between client 140, load balancer 110, application server 120 and application server 150, including the respective programs, software and/or files of client 140, load balancer 110, application server 120 and protection program 175, in accordance with a desired embodiment of the present invention.

In various embodiments of the present invention, client 140, load balancer 110, application server 120 and application server 150 are computing devices that can be servers, laptop computers, tablet computers, netbook computers, personal computers (PC), or desktop computers. In another embodiment, client 140, load balancer 110, application server 120 and application server 150 represent computing systems utilizing clustered computers and components to act as a single pool of seamless resources. In general, load balancer 110, can be any computing device or a combination of devices with access to service request 114 and error codes 116 and is capable of executing service program 112. In general, application server 120 and application server 150, can be any computing device or a combination of devices with access to process request 115, bad request 125, blacklist 155 and rules 165 and is capable of executing protection program 175. In general, client 140 can be any computing device or a combination of devices capable of sending data to, including hypertext transfer protocol requests (e.g., HTTP-GET), and receiving data from load balancer 110. Client 140, load balancer 110, application server 120 and application server 150 may include internal and external hardware components, as depicted and described in further detail with respect to FIG. 4.

In this exemplary embodiment, hypertext transfer protocol (HTTP) is the dominant protocol used by the SaaS system for internet access and communication. In other embodiments a variety of internet and communication protocols can be utilized, which may include HTTP.

In this exemplary embodiment, a request is sent from client 140 to load balancer 110. Load balancer 110 identifies application server 120, that is capable of servicing the request, and passes the request to application server 120. Application server 120 attempts to processes the request. If application server 120 successfully processes the request, then application server 120 sends a result to load balancer 110. If there is a fault or failure of application server 120, wherein the attempted processing of the request was not the cause of the fault or failure, then the request will be passed, by load balancer 110, to application server 150, that is also capable of servicing the request, for processing. However, if the attempted processing of the request was the cause of the fault or failure of application server 120, then load balancer 110 sends an error message to client 140. If application server 150 successfully processes the request, then application server 150 sends a result to load balancer 110. If a result is received by load balancer 110, then load balancer 110 sends a reply to client 140.

In this embodiment, load balancer 110 includes service program 112, service request 114 and error codes 116. Load balancer 110 is a reverse proxy which operates as an intermediary between client 140, application server 120 and application server 150. Load balancer 110 receives requests from multiple users (e.g., client 140) and distributes the requests to a server(s) (e.g., an application server 120) that has the required resources to service a given request. The successful processing of a request by a server (e.g., application server 150) generates a result that is returned to load balancer 110. Load balancer 110 passes the result to client 140, in the form of a reply.

In this embodiment, when a request is received by load balancer 110, the request is stored as service request 114, which is retained in a tangible computer memory that is accessible by load balancer 110. The information stored in service request 114 is passed, by load balancer 110, to a server(s), such as application server 120, for processing.

In this embodiment, service request 114 is in the form of an HTTP-GET request. HTTP defines methods (sometimes referred to as "verbs") to indicate the desired action to be performed on the identified resource/server(s). An HTTP-GET is a method of requesting a representation of the specified resource. The GET method includes instructions to retrieve whatever information (in the form of an entity) is identified by the Uniform Resource Identifier (URI) of the request (a.k.a. Request-URI). If the Request-URI refers to a data-producing process, it is the produced data which shall be returned as the entity in the response and not the source text of the process, unless that text happens to be the output of the process. HTTP-GET requests should only retrieve data and should have no other effect on a server(s) outside of that function. For example, load balancer 110 receives a request, from client 140, for an updated weather report. Load balancer 110 identifies a server that has access to weather report data and passes the request to that server. The server assembles the weather report data into a result and passes that result to load balancer 110. Load balancer 110 then forms a reply using the result and sends the reply to client 140. The location of, content of, and the method used to process service request 114 can vary in other embodiments.

In this embodiment, error codes 116 are HTTP error codes. Error codes 116 can be included in a reply to client 140 if processing a request from client 140 has caused a fault or failure of a server. Error codes 116 can also be included in a reply if the server processing a request from client 140 has failed to complete the processing and/or has failed to communicate with load balancer 110. For example, application server 120 indicates to load balancer 110 that the request is forbidden and that the server will not allow access the requested file. Load balancer 110 identifies an appropriate error code in error codes 116 and sends a reply to client 140 including the HTTP error code "403 Forbidden". In another example, application server 120 is unable to handle requests due to a temporary overload or due to the server being temporarily closed for maintenance. Load balancer 110 identifies an appropriate error code in error codes 116 and sends a reply to client 140 including the HTTP error code "503 Service Unavailable".

In this embodiment, application server 120 and application server 150 respectively include protection program 175, process request 115, bad request 125, blacklist 155 and rules 165. Application server 120 and application server 150 are servers with the ability and access to the resources needed to complete the processing of a request received from load balancer 110. In the event of a fault or failure application server 120 and/or application server 150 will send a message to load balancer indicating the problem. The message is a type of "SOS" signal that is sent if a server crash is imminent. For example, application server 120 attempts to process a request and faults. Before a crash occurs, application server 120 sends an "SOS" message to load balancer 110 indicating that a fault has occurred due to the attempted processing of a request from client 140 along with the details of the request. In some embodiments, application server 120 and application server 150 will attempt to send the "SOS" for a predetermined time period and/or will make a predetermined number of attempts to send the "SOS" before shutting down and restarting. In some embodiments the "SOS" message includes a copy of the "Bad Request.Txt" file, associated with the request, which can then be passed to other servers.

In this embodiment, process request 115 is a request received, by application server 120 and/or application server 150, from load balancer 110. Process request 115 is retained in a tangible computer memory that is accessible by application server 120 and/or application server 150. Process request 115 contains the information needed by application server 120 and/or application server 150 to process the request originated by client 140. Typically, process request 115 includes an HTTP-GET request. The information/request stored in process request 115 is processed, by application server 120 and/or application server 150, and the result is passed to load balancer 110.

In this embodiment, bad request 125 is a file that is generated as a result of a fault or failure occurring, in application server 120 and/or application server 150, due to the processing of a request. Before application server 120 and/or application server 150 crash and/or enter into a restart sequence bad request 125 is updated to include a "Bad Request.Txt" file. The "Bad Request.Txt" file includes the identifying information of client 140 (the source of the request) and information relating to and defining the request that led to the fault or failure occurring. Upon restarting after a fault/failure, application server 120 and/or application server 150 read the "Bad Request.Txt" files included in bad request 125. Application server 120 and/or application server 150 determine if there has been a number of failures, due to a given "Bad Request.Txt" file, that exceeds a predetermined threshold. If the threshold has been exceeded, then the request is promoted to blacklist 155. For example, the processing of request X has lead to a fault in application server 120. Upon restarting, application server 120 reads the bad request 125 files and determines that the "Bad Request.Txt" corresponding to request X has occurred 3 times in the last 24 hours, which exceeded the threshold. In response to the determination, application server 120 promotes request X to blacklist 155. In some embodiments, a copy of a "Bad Request.Txt" file can be received from another server, via load balancer 110, and be used to update bad request 125 and/or blacklist 155.

In this embodiment, blacklist 155 is a file containing a list of requests that will not be processed if they are received by application server 120 and/or application server 150. As requests are received by application server 120 and application server 150 they are compared to blacklist 155. If a request matches one of those included in blacklist 155, then the request is not processed and a notification is sent to load balancer 110 indicating that the request will not be processed. For example, application server 120 receives a request that matches a blacklist 155 entry. As a result application server 120 sends a notification to load balancer 110. Load balancer 110 then sends a reply to client 140 including the HTTP error code "403 Forbidden".

If a request is promoted to blacklist 155, then a copy of the list entry is sent to load balancer 110 for distribution to other servers. The distribution of blacklist 155 list entries can reduce the number of server failures within a request processing environment. For, example, repeated attempts by application server 120 to process request X has lead to repeated crashes and the promotion, as a new list entry, of request X to blacklist 155. The new list entry is copied and passed to load balancer 110. Load balancer 110 passes the new list entry to application server 150. Application server 150 updates its own blacklist 155 using the new list entry. When a request matching the new list entry is received by either application server 120 and/or application server 150 it will not be processed.

In this embodiment, rules 165 is a set of rules governing the operation of request denial by application server 120 and application server 150. Rules 165 includes the threshold value used to determine if a request (one that generates a "Bad Request.Txt" file) should be placed on blacklist 155. For example, if a request causes a server to crash three times, yielding three "Bad Request.Txt" files, and the threshold limit was two, then the request would be promoted to blacklist 155. In other embodiments, rules 165 may also include a timeout threshold and/or the number of "SOS" sending attempts to be made before shutting down an application server.

Figure 2:
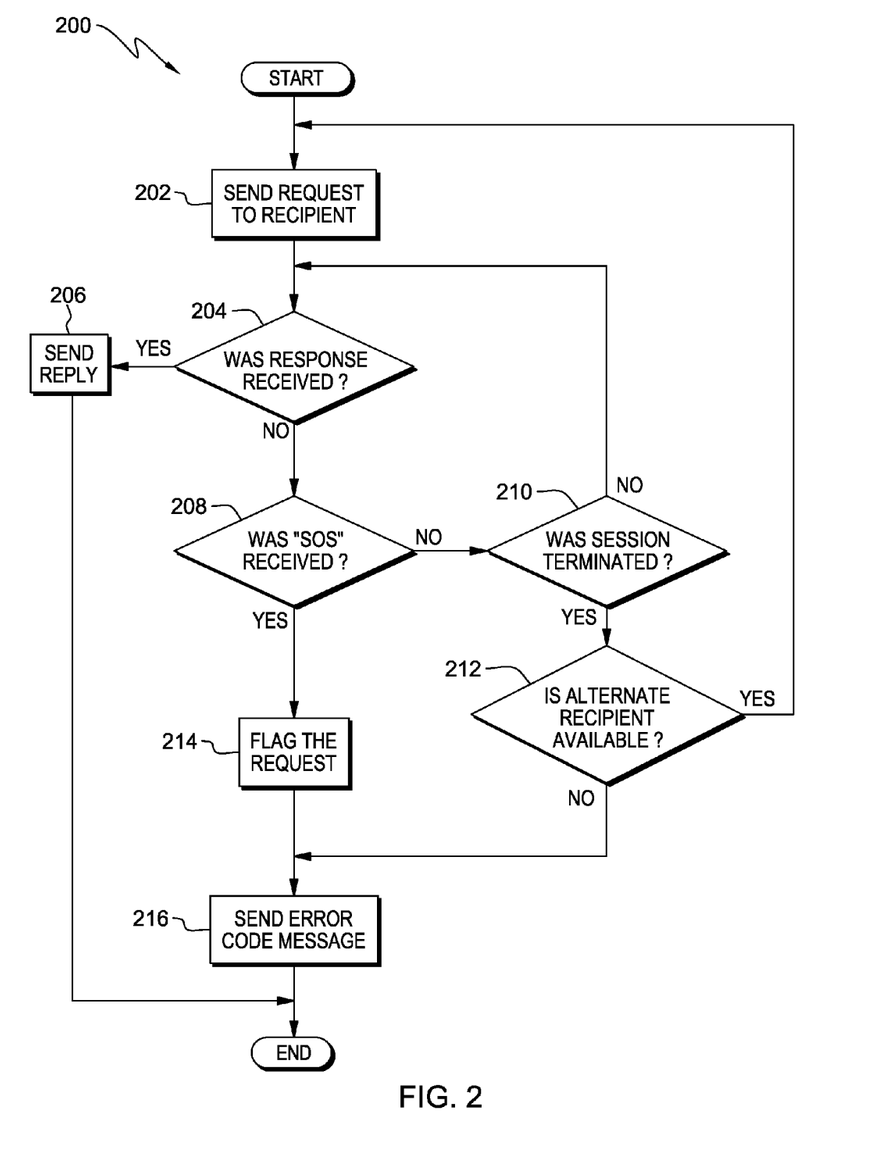
FIG. 2 is a flowchart depicting operational steps of a protection program, on a load balancer computer within the request processing environment of FIG. 1, in accordance with an embodiment of the present invention.

FIG. 2 is a flowchart depicting operational steps of service program 112, generally designated 200, executing on load balancer computer 110 within the request processing environment, in accordance with an embodiment of the present invention.

In this exemplary embodiment, in step 202, load balancer 110 receives a request from client 140. Application server 120 is identified as having access to the resources needed to process the request. Service program 112 saves a copy of the request to service request 114 and passes the request information to application server 120.

In this exemplary embodiment, in step 204, service program 112 monitors signals from application server 120 for a response that includes the results of the processed request. If a response is received, then service program 112 executes step 206. If no response is received from application server 120, then service program 112 executes step 208.

In step 206 of this embodiment, service program 112 uses the information received in the response from application server 120 to generate a reply. The reply is sent to the requesting computer, client 140.

In step 208 of this embodiment, service program 112 monitors signals from application server 120 for a signal indicating a fault, failure of application server 120, specifically an "SOS" signal. If an "SOS" is received from application server 120, then protection program proceeded to step 214. If no "SOS" is received, then service program 112 executes step 210.

In this embodiment, in step 210, service program 112 determines if the session and/or communication with application server 120 has been terminated. If application server 120 is still communicating and indicates that the request is being processed then protection program returns to step 204. If the session and/or communication with application server 120 has been terminated, then service program 112 proceeds to step 212. In other embodiments, step 210 includes checking for the completion of a request within a time limit. If the request has not been completed in a timely fashion (i.e., within the time limit) then service program 112 proceeds to step 212.

In step 212 of this embodiment, service program 112 determines if there is an alternate recipient available that can complete the request (i.e., application server 150). If a recipient is available that can complete the request, then service program 112 returns to step 202 and passes the request information to application server 150. If it is determined that there is not an alternate recipient available that can complete the request, then service program 112 proceeds to step 216.

In this embodiment, if in step 208 an "SOS" was received from application server 120, then in step 214 service program 112 flags the request, stored in service request 114, indicating that the request has caused a failure/fault of a server and should not be passed to another server for processing. If a blacklist entry for a request is received from application server 120, then the blacklist entry is passed along to application server 150. In some embodiments, if the "SOS" includes a "Bad Request.Txt" file, then the "Bad Request.Txt" file is passes to other servers (i.e., application server 150).

In this embodiment, in step 216 a reply is sent to client 140 that includes an error code and/or message. Often, the reply is a simple HTTP error code. For example, if step 216 was initiated by the completion of step 214, then a likely error code would be "403 Forbidden" since the request is no longer allowed. However, if step 216 was initiated by the completion of step 212 then a likely error code would be "503 Service Unavailable" since there was no server available to process the request. Step 216 is also initiated if a server returns a message indicating that a received request matches an entry in blacklist 155.

Figure 3:
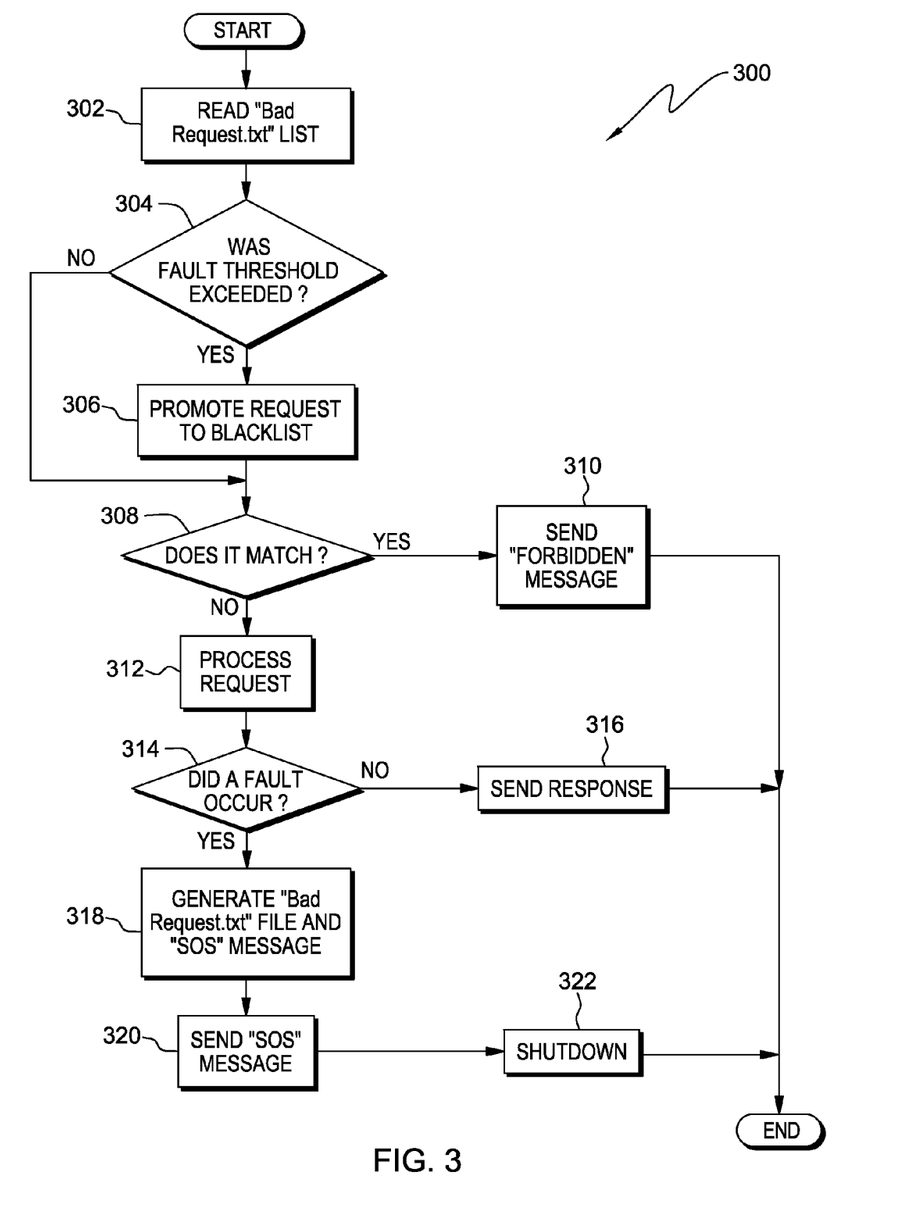
FIG. 3 is a flowchart depicting operational steps of a protection program, on an application server and an application server within the request processing environment of FIG. 1, in accordance with an embodiment of the present invention.

FIG. 3 is a flowchart depicting operational steps of a protection program 175, generally designated 300, executing on the application server 120 and the application server 150 within the request processing environment of FIG. 1, in accordance with an embodiment of the present invention.

In this embodiment, in step 302 application server 120, upon start/re-start reads the entries of bad request 125. The entries in bad request 125 are analyzed and the number of entries corresponding to a given request are determined.

In this embodiment, in step 304, if the number of "Bad Request.Txt" files associated to a given request is in excess of the threshold then protection program 175 executes step 306. If however the threshold has not been exceeded then protection program 175 executes step 308.

In this embodiment, in step 306, protection program 175 uses information included in bad request 125 (i.e., "Bad Request.Txt" files) to create new entries for blacklist 155. A copy of a new entry in bad request 125 is passed to load balancer 110.

In this embodiment, in step 308, protection program 175 receives a request from load balancer 110. Protection program 175 compares the request to blacklist 155 and checks for a match. If the request matches an entry in blacklist 155 then protection program 175 proceeds to step 310. If the request does not match an entry in blacklist 155, then protection program 175 proceeds to step 312.

In this embodiment, in step 310, protection program 175 sends a response/message to load balancer 110 indicating that the request is not allowed. The message can include the HTTP error code "403 Forbidden" indicating that the request is not allowed.

In this embodiment, in step 312, a request received by protection program 175 is processed and a result is generated or the attempted processing of the request causes a fault/failure of application server 120.

Protection program 175 determines, in step 314 of this embodiment, if a fault/failure has occurred in application server 120. If a fault/failure did not occur, (i.e., a result for the request was produced) then protection program 175 proceeds to step 316. If a fault/failure did occur as a result of processing a request, then protection program 175 proceeds to step 318. In other embodiments if a fault/failure occurs but it can not be attributed to the processing of a request, then protection program 175 will return to step 312.

In this embodiment, in step 316, protection program 175 uses the result produced in step 312 to generate a response. The response is passed to load balancer 110.

In this embodiment, if a fault/failure of application server 120 has occurred as a result of processing a request, then in step 318, protection program 175 generates a "BadRequest.Txt" file for the request that caused the fault/failure of application server 120 and an "SOS" message. The "BadRequest. Txt" file is saved to bad request 125. Protection program 175 then proceeds to step 320.

In this embodiment, in step 320, protection program 175 sends the "SOS" message to load balancer 110. This is often accomplished by spawning an isolated thread (i.e., a small sequence of programmed instructions that can be managed independently by an operating system scheduler). The isolated thread is then used to send the "SOS" message, which contains information identifying the request that caused the fault/failure of application server 120. In some embodiments, the "SOS" message includes a copy of the bad request 125 file that was generated in step 318.

In step 322 of this embodiment, protection program 175 prompts application server 120 to initiate a shutdown and restart sequence. In some embodiments, the prompting to initiate a shutdown sequence may be delayed to allow the successful sending of the "SOS" message. In other embodiments, the shutdown sequence will initiate after a given time period has elapsed and/or after a number of "SOS" sending attempts have been made.

Figure 4:
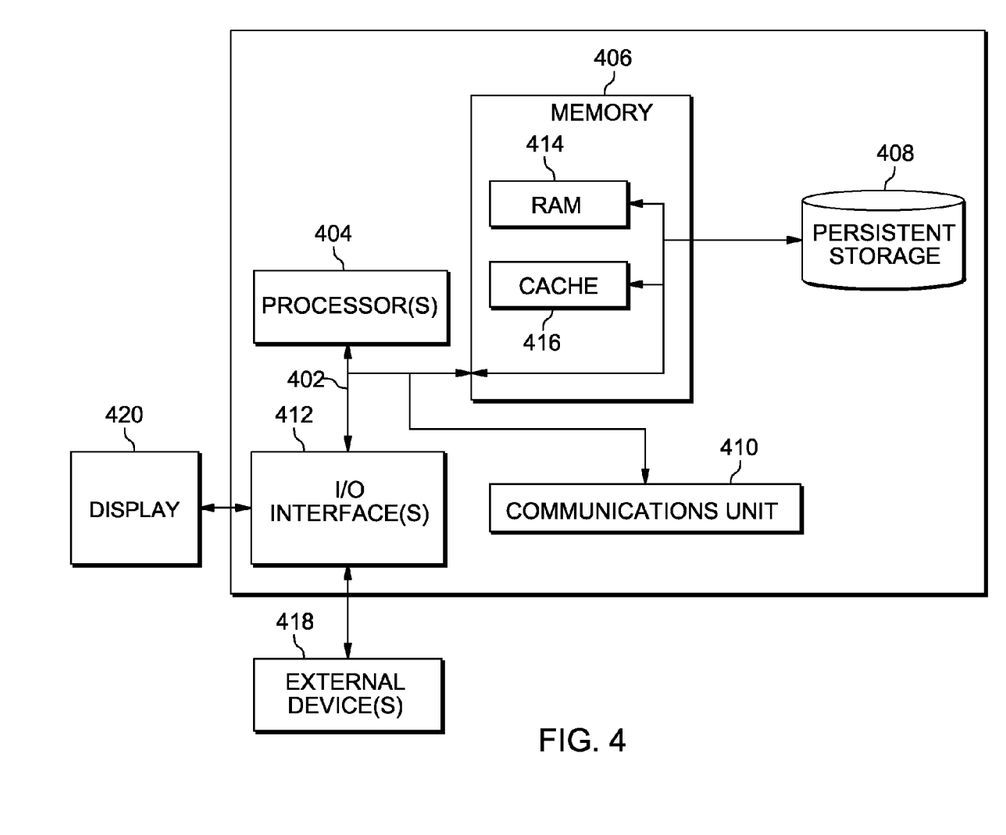
FIG. 4 is a block diagram of internal and external components within the computing devices of FIG. 1 in accordance with an embodiment of the present invention.

FIG. 4 is a block diagram of internal and external components within the computing devices of FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

The computing devices of FIG. 1, in accordance with an illustrative embodiment of the present invention, include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Service program 112, service request 114 and error codes 116 of load balancer 110, and protection program 175, process request 115, bad request 125, blacklist 155 and rules 165 of application server 120 and protection program 175, are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of client 140, load balancer 110, application server 120 and application server 150. In these examples, communications unit 410 includes one or more network interface cards. Communications unit 410 may provide communications through the use of either or both physical and wireless communications links. Protection program 175 and service program 112 may be downloaded to persistent storage 408 through communications unit 410.

I/O interface(s) 412 allows for input and output of data with other devices that may be connected to load balancer 110, application server 120, and application server 150. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., protection program 175 and service program 112, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. In some implementations, the programs may include other and/or additional steps that, for clarity, are not depicted. Further, in some implementations, the program steps may be executed in a different order presented and that the order presented in the discussions of FIGS. 2 and 3 is illustrative. Additionally, in some implementations, certain program steps may be executed in a substantially simultaneous manner or may be omitted.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of preventing heuristic failure in a software as a service system, the method comprising the steps of:
   a first computer receiving a first request for service from a client computer;
   the first computer delegating the first request to a second computer;
   the first computer receiving a first message from the second computer, wherein the first message contains data that identifies the first request and indicates an imminent fault of the second computer, wherein the imminent fault of the second computer was caused by a processing of the first request; and
   the first computer sending a second message to a third computer, wherein the second message indicates a warning about the first request.

2. The method of claim 1, further including the step of:
   the first computer sending a third message to the client computer indicating the first request will not be processed.

3. The method of claim 1, further including the steps of:
   the first computer receiving a fourth message from the second computer, wherein the fourth message indicates an imminent fault of the second computer and that a processing of a second request was not the cause of the imminent fault; and
   the first computer delegating the second request to a third computer.

4. The method of claim 1, further including the steps of:
   the first computer receiving a fifth message from one or both of the second computer and the third computer, wherein the fifth message indicates that a third request matches the first request and will not be processed; and
   the first computer sending a sixth message to the client computer indicating the third request will not be processed.

5. The method of claim 1, wherein the second message includes:
   data that identifies the first request.

6. The method of claim 1, wherein the second message includes:
   information indicating that a threshold for faults due to the processing of the first request has been exceeded.

7. The method of claim 1, wherein the first message further includes:
   information indicating that a threshold for faults due to the processing of the first request has been exceeded.

8. A computer system for preventing heuristic failure in a software as a service system, the computer system comprising:
   one or more processors, one or more computer-readable memories, one or more computer-readable storage devices, wherein the computer-readable storage devices are not transitory signals, and program instructions stored on at least one of the one or more storage devices for execution by at least one of the one or more processors via at least one of the one or more memories, the program instructions comprising:
   program instructions to receive a first request for service from a client computer;
   program instructions to delegate the first request to a second computer;
   program instructions to receive a first message from the second computer, wherein the first message contains data that identifies the first request and indicates an imminent fault of the second computer, wherein the imminent fault of the second computer was caused by a processing of the first request; and
   program instructions to send a second message to a third computer, wherein the second message indicates a warning about the first request.

9. A computer system in accordance with claim 8, further comprising program instructions to:
   send a third message from the first computer to the client computer indicating the first request will not be processed.

10. A computer system in accordance with claim 8, further comprising program instructions to:
    receive by the first computer a fourth message from the second computer, wherein the fourth message indicates an imminent fault of the second computer and that a processing of a second request was not the cause of the imminent fault; and
    delegate by the first computer the second request to a third computer.

11. A computer system in accordance with claim 8, further comprising program instructions to:
    receive by the first computer a fifth message from one or both of the second computer and the third computer, wherein the fifth message indicates that a third request matches the first request and will not be processed; and
    send by the first computer a sixth message to the client computer indicating the third request will not be processed.

12. A computer system in accordance with claim 8, wherein the second message includes:
    data that identifies the first request.

13. A computer system in accordance with claim 8, wherein the first message and the second message includes:
    information indicating that a threshold for faults due to the processing of the first request has been exceeded.

14. A computer program product to prevent heuristic failure in a software as a service system, the computer program product comprising:
    one or more computer-readable storage devices and program instructions stored on at least one of the one or more computer-readable storage devices, wherein the computer-readable storage devices are not transitory signals, the program instructions comprising:
    program instructions to receive a first request for service from a client computer;
    program instructions to delegating the first request to a second computer;
    program instructions to receiving a first message from the second computer, wherein the first message contains data that identifies the first request and indicates an imminent fault of the second computer, wherein the imminent fault of the second computer was caused by a processing of the first request; and
    program instructions to sending a second message to a third computer, wherein the second message indicates a warning about the first request.

15. The computer program product of claim 14, further comprising program instructions to:
    send a third message from the first computer to the client computer indicating the first request will not be processed.

16. The computer program product of claim 14, further comprising program instructions to:
- receive by the first computer a fourth message from the second computer, wherein the fourth message indicates an imminent fault of the second computer and that a processing of a second request was not the cause of the imminent fault; and
- delegate by the first computer the second request to a third computer.

17. The computer program product of claim 14, further comprising program instructions to:
- receive by the first computer a fifth message from one or both of the second computer and the third computer, wherein the fifth message indicates that a third request matches the first request and will not be processed; and
- send by the first computer a sixth message to the client computer indicating the third request will not be processed.

18. The computer program product of claim 14, wherein the second message includes:
- data that identifies the first request.

19. The computer program product of claim 14, wherein the first message and the second message includes:
- information indicating that a threshold for faults due to the processing of the first request has been exceeded.

20. The computer program product of claim 14, wherein the first message further includes:
- information indicating that a threshold for faults due to the processing of the first request has been exceeded.

\* \* \* \* \*